W. F. PINKERTON.
STOVE.
APPLICATION FILED MAY 27, 1910.
985,058.
Patented Feb. 21, 1911.
2 SHEETS—SHEET 1.
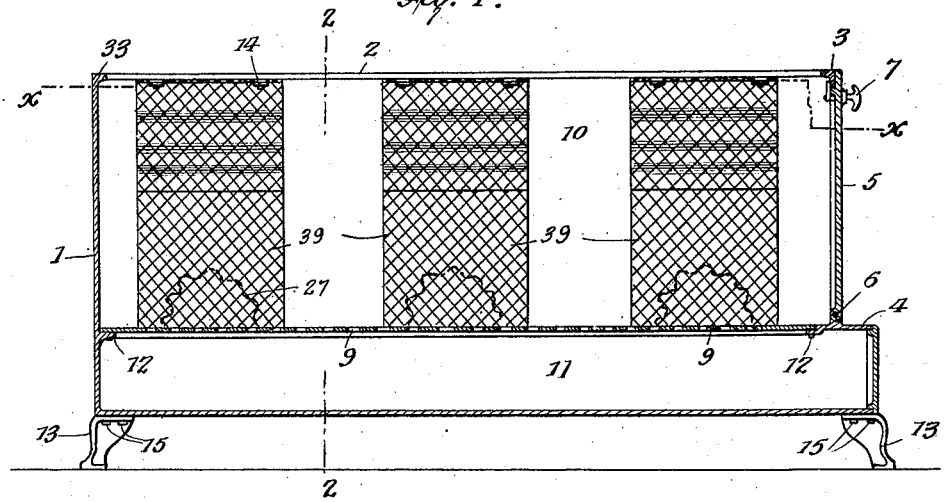
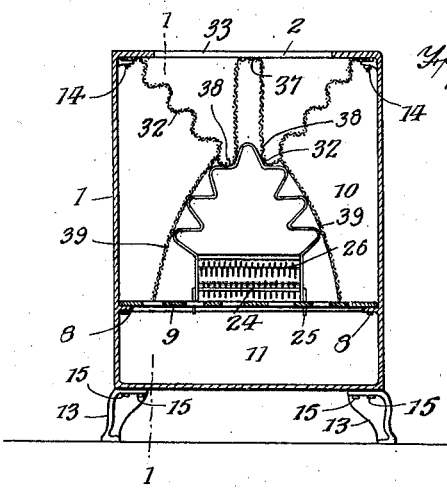
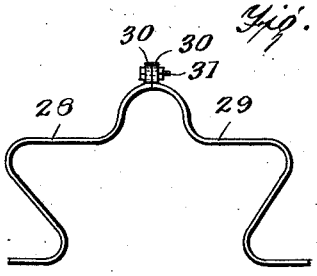
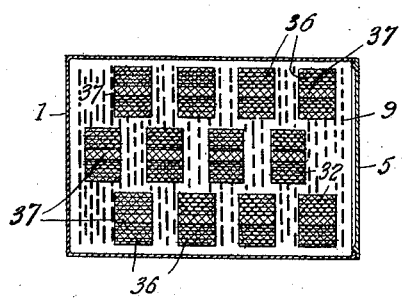
WITNESSES:
INVENTOR
WILLIAM F. PINKERTON,
BY
ATTORNEYS

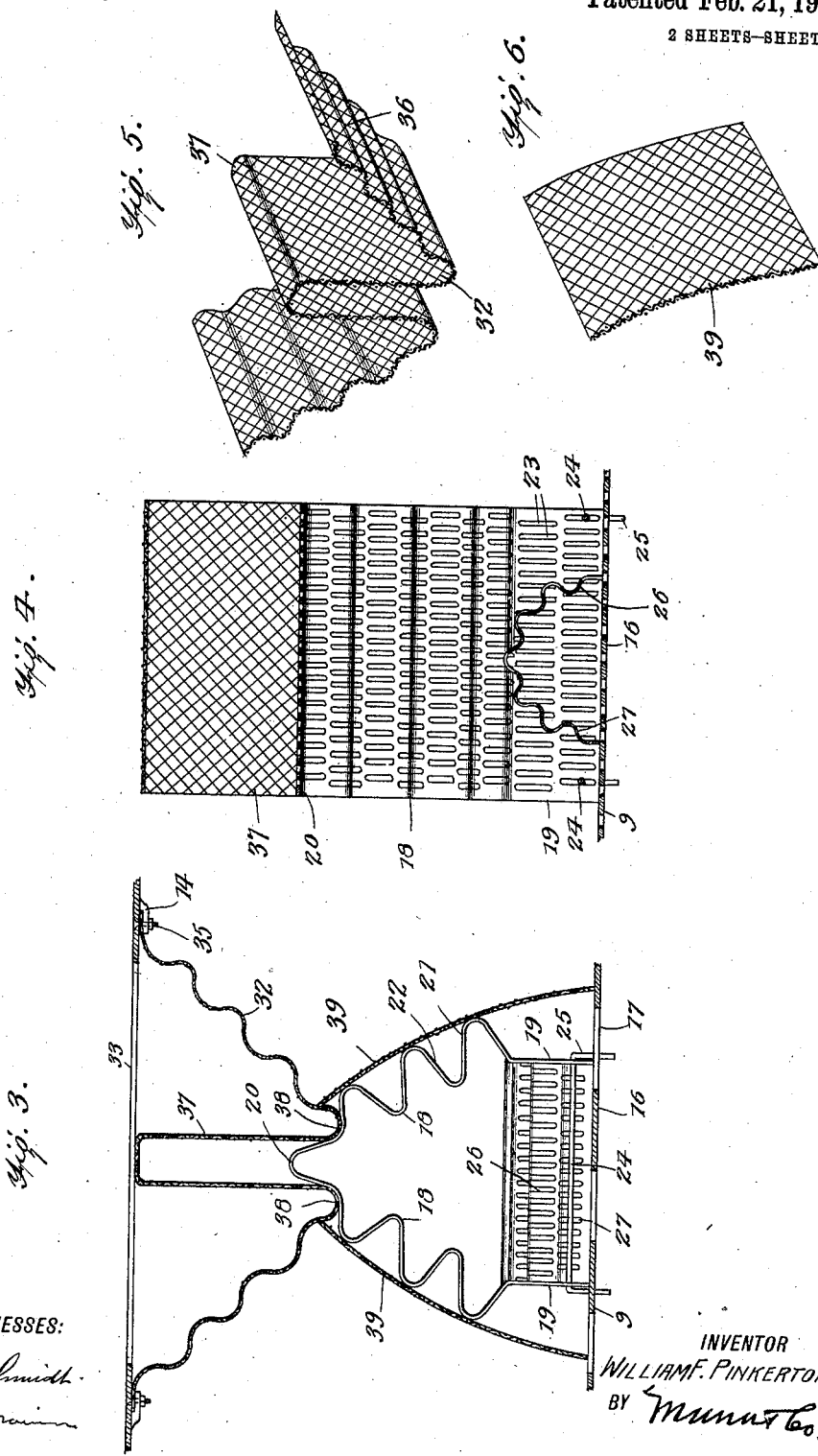

UNITED STATES PATENT OFFICE.

WILLIAM FRANK PINKERTON, OF DENVER, COLORADO.

STOVE.

985,058. Specification of Letters Patent. Patented Feb. 21, 1911.

Application filed May 27, 1910. Serial No. 563,733.

*To all whom it may concern:*

Be it known that I, WILLIAM FRANK PINKERTON, a citizen of the United States, and a resident of Denver, in the county of Denver and State of Colorado, have invented certain new and useful Improvements in Stoves, of which the following is a specification.

My invention is an improvement in stoves, and consists in certain novel constructions, and combinations of parts, hereinafter described and claimed.

The object of the invention is to provide a simple and inexpensive device of the character specified, especially adapted for utilizing fuels of low heat value, such as waste paper, straw, dust, refuse, and the like, in an economical manner, and in such a manner as to obtain the highest possible production of heat.

Referring to the drawings forming a part hereof, Figure 1 is a section on the line 1—1 of Fig. 2, Fig. 2 is a section on the line 2—2 of Fig. 1, Fig. 3 is an enlarged end view of the arches, Fig. 4 is a side view Fig. 6 is a similar view of one section of is a perspective view of the upper arch, Fig. 6 is a smaller view of one section of the guard, Fig. 7 is a bottom plan view of the grate, and Fig. 8 is an end view of a modified form of arch.

The present embodiment of the invention comprises a casing 1 substantially rectangular in cross section, and having in its top a rectangular opening 2, and at one end the upper part of the casing is offset inwardly at 3, to form a ledge 4 between the offset portion and the lower portion, and a door 5 is provided in the offset portion, hinged to the casing at 6, and having a catch 7.

At the level of the shoulder or ledge 4, the inner face of the casing is provided with a ledge 8, on which is supported a grate 9, dividing the casing into a combustion chamber 10 above the grate, and an ash pit 11 below the grate, and the grate is held to the ledge by bolts 12. The casing is supported on legs 13, one arranged at each corner, and secured to the casing by bolts 15, and at its top on each side of the opening 2 is arranged a plurality of brackets 14.

The grate shown more especially in Fig. 7, consists of a plate 16, rectangular in shape to fit within the casing, and provided at intervals with rectangular openings 17, the said openings being arranged in rows, and the members of each row being staggered with respect to the members of the other rows. Above the grate, in the combustion chamber, is arranged a plurality of similar separating structures, or radiators. Each of the said structures comprises an outer arch 18, Fig. 3, the ends of whose arms are straight as at 19, and rest on the grate, and the bow 20 of the arch is transversely corrugated being composed of alternate portions 21 bent in one direction, and intermediate portions 22 bent in the opposite direction, and each of the said arches, Fig. 4, is composed of a plate of sheet material provided with transverse rows or series of longitudinal slots 23. Near each end a rod 24 is arranged transversely of each arch, the ends 25 thereof passing through the slots 23 and being bent laterally downward, and passing through the openings 17 of the grate.

Inside of each of the outer arches 18, and at right angles thereto is a smaller inner arch 26, Figs. 3 and 4, composed of a plate of sheet material having transverse rows of longitudinal slots 27, and bent in a similar manner to the arch 18. In edge view, the arches 18 and 26 are scalloped as shown in Figs. 3 and 4, and each may be composed of two sections 28 and 29, Fig. 8, if desired, each section having at its top a flange 30, connected to the flange of the other section by bolts 31.

An upper inverted arch 32, consisting of a sheet of gauze or like perforate material, Fig. 5, is arranged above each outer arch, the end edges of the sheet being bolted to the brackets 14 by bolts 35, which pass through the flanges and the top 33 of the casing. The sides of the upper arch are bent into transverse corrugations 36, and at the center of the bow, the sheet is bent inwardly and upwardly to form an open loop 37, into which the central scallop of the outer arch fits.

The end of the loop touches the under face of the top 33 of the casing, and the engagement of the return portions 38 of the loop on each side of the said central scallop or peak of the outer arch holds the said arch from lateral movement. A guard composed of two sheets 39 of gauze or like perforate material is arranged outside of the outer arch, the sheets being curved longitudinally (Fig. 6), and resting one on each side of the outer arch, at their lower ends on the grate, and at their upper ends against the sides of the upper arch.

In the present embodiment of the invention, three radiating structures are shown, arranged in spaced relation, Fig. 1, but it is evident that the number and arrangement might be varied to a considerable degree, without departing from the spirit of the invention. The radiators are easily assembled and disassembled, and when assembled are sufficiently rigid to prevent accidental displacement.

The guard 39 is designed to prevent packing of the fuel too tightly against the outer arch, and the arches hold the fuel in such position that the air necessary for combustion can obtain free access to every part thereof. The loops 37 act as chimneys, and permit the smoke to escape to the top of the casing, where it may be collected by a suitable hood if desired and carried away by a flue.

In operation, the fuel is fed through the door 5, into the space between the sides of the upper arches and loop or chimney 37, and may be packed as tightly as desired. The fuel is also packed between the side walls and the radiating structures and between the said structures which in addition to acting as radiators act as separators and conducting structures for the air. After the casing is filled, it is ignited through a damper so arranged as to permit the ignition, and to admit the proper amount of air to insure perfect combustion.

The arches should be made of quite heavy grating in order to withstand a continuous flame, as for instance, in burning flax straw which makes a very hot fire and is the favorite fuel for straw burning stoves. The arches should be made of either cast or wrought iron or steel. It is evident however, that any suitable material might be made use of.

It is obvious that the material of the arches and guards, may be either cast, or wrought metal, and that the bars of the arches and guards shall be of sufficient thickness to withstand the action of fire. The mesh of the screens or grating of the arches and guards may be finer or coarser in accordance with the fuel to be burned. While it is desirable that the arches be scalloped as shown, in stoves for burning some classes of fuel in other cases it may be omitted.

I claim:

1. A device of the character specified, comprising a casing substantially rectangular in cross section, and having at one end a door, and having in its top a longitudinal opening, and a grate arranged transversely of the casing and dividing it into a combustion chamber and an ash pit, said grate having a plurality of openings therethrough, and a plurality of fuel dividing and air conducting structures supported in spaced relation in the combustion chamber between the grate and the top of the casing, each of the said structures comprising an outer arch composed of a perforate sheet bent to form an arch having transversely corrugated sides and a central corrugation at its top, an inner similar arch within the first named arch and arranged at right angles thereto, an upper inverted arch of perforate material having the ends of its sides secured to the top of the casing, said sides being transversely corrugated and the arch being return bent upon itself at its center to form an open loop extending upwardly to approximately the level of the top of the casing, rods extending through the sides of the outer arch and having their ends bent laterally and passed through openings of the grate, and guard plates of perforate material on each side of the outer arch.

2. A device of the character specified, comprising a casing substantially rectangular in cross section, and having at one end a door, and having in its top a longitudinal opening, and a grate arranged transversely of the casing and dividing it into a combustion chamber and an ash pit, said grate having a plurality of openings therethrough, and a plurality of fuel dividing and air conducting structures supported in spaced relation in the combustion chamber between the grate and the top of the casing, each of the said structures comprising an outer arch composed of a perforate sheet bent to form an arch having transversely corrugated sides and a central corrugation at its top, an inner similar arch within the first named arch and arranged at right angles thereto, an upper inverted arch of perforate material having the ends of its sides secured to the top of the casing, said sides being transversely corrugated and the arch being return bent upon itself at its center to form an open loop extending upwardly to approximately the level of the top of the casing, and guard plates of perforate material on each side of the outer arch and resting against the sides thereof.

3. A device of the character specified, comprising a casing substantially rectangular in cross section, and having at one end a door, and having in its top a longitudinal opening, and a grate arranged transversely of the casing and dividing it into a combustion chamber and an ash pit, said grate having a plurality of openings therethrough, and a plurality of fuel dividing and air conducting structures supported in spaced relation in the combustion chamber between the grate and the top of the casing, each of the said structures comprising inner and outer arched sheets of perforate material, the inner arch being arranged at right angles to the outer arch, an upper inverted arch arranged above the outer arch, said upper arch being return bent upon itself at its center to form an open upwardly extending loop, and a guard plate of perforate material on each side of the outer arch and resting against the wall thereof, said arches being transversely corrugated.

4. A device of the character specified, comprising a casing substantially rectangular in cross section, and having at one end a door, and having in its top a longitudinal opening, and a grate arranged transversely of the casing and dividing it into a combustion chamber and an ash pit, said grate having a plurality of openings therethrough, and a plurality of fuel dividing and air conducting structures supported in spaced relation in the combustion chamber, between the grate and the top of the casing, each of the said structures comprising inner and outer arched sheets of perforate material, the inner arch being arranged at right angles to the outer arch, an upper inverted arch arranged above the outer arch, said upper arch being return bent upon itself at its center to form an open upwardly extending loop, and a guard plate of perforate material on each side of the outer arch resting against the walls thereof.

5. A device of the character specified, comprising a casing substantially rectangular in cross section, and having at one end a door, and having in its top a longitudinal opening, and a grate arranged transversely of the casing and dividing it into a combustion chamber and an ash pit, said grate having a plurality of openings therethrough, and a plurality of fuel dividing and air conducting structures supported in spaced relation in the combustion chamber between the grate and the top of the casing, each of the said structures comprising inner and outer arches of perforate material arranged at right angles to each other, and an upper arch of perforate material having at its center an upwardly extending open looped portion, and contacting with the outer arch, and a guard plate of perforate material on each side of the outer arch.

6. In a device of the character specified, a fuel separating and air conducting device comprising inner and outer arches of perforate transversely corrugated sheet material, the sides of the outer arch being straight and substantially parallel for a portion of their length, and the inner arch being arranged at right angles to the outer arch and between the said straight portions, an upper inverted arch of transversely corrugated perforate material having at its center a return bent upwardly extending portion and resting at each side of the said portion on the outer arch, and a guard plate of perforate material on each side of the outer arch and resting against the side thereof.

7. In a device of the character specified, a fuel separating and air conducting device comprising inner and outer arches of perforate transversely corrugated sheet material, the sides of the outer arch being straight and substantially parallel for a portion of their length, and the inner arch being arranged at right angles to the outer arch and between the said straight portions, an upper inverted arch of perforate material resting on the outer arch and having at its center a return bent upwardly extending portion, and a guard plate of perforate material at each side of the outer arch.

8. In a device of the character specified, a fuel separating and air conducting device comprising inner and outer arches of perforate transversely corrugated sheet material, the sides of the outer arch being straight and substantially parallel for a portion of their length, and the inner arch being arranged at right angles to the outer arch and between the said straight portions, an upper inverted arch, and a guard plate of perforate material on each side of the outer arch.

9. In a device of the character specified, a fuel separating and air conducting device, comprising outer and inner arches of perforate transversely corrugated sheet material, the inner arch being at right angles to the outer arch, an upper inverted arch resting on the outer arch, and a guard comprising a sheet of perforate material at each side of the outer arch, said upper arch having at its center a return bent portion forming an upwardly extending open passage.

10. In a device of the character specified, a fuel separating and air conducting device, comprising outer and inner arches of perforate transversely corrugated sheet material, the inner arch being at right angles to the outer arch, an upper inverted arch resting on the outer arch, and a guard comprising a sheet of perforate material at each side of the outer arch.

11. In a device of the character specified, a fuel separating and air conducting device, comprising inner and outer arches of perforate corrugated sheet material, the inner arch being at right angles to the outer arch, and an upper inverted arch also of perforate material resting on the outer arch.

12. In a device of the character specified, a fuel separating and air conducting device, comprising inner and outer arches of perforate corrugated sheet material, the inner arch being at right angles to the outer arch.

WILLIAM FRANK PINKERTON.

Witnesses:
 THOS. L. BUIE,
 THOS. R. DEWING.